April 9, 1963   C. C. STANTON   3,084,959
PIPE COUPLING HAVING A BAND CLAMP AND RESILIENT SLEEVE
Filed Aug. 5, 1959
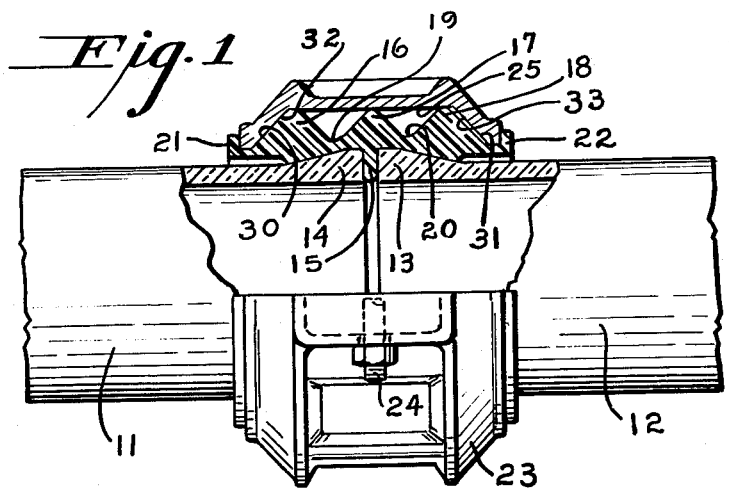
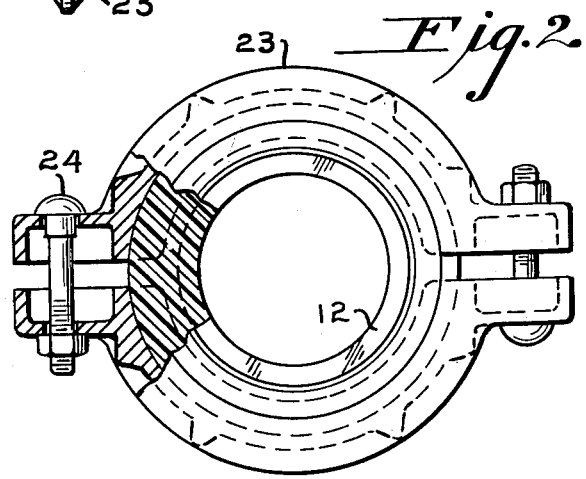
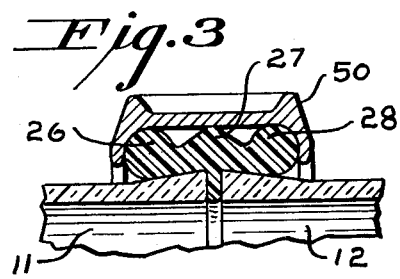
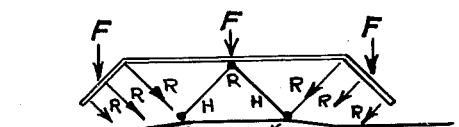
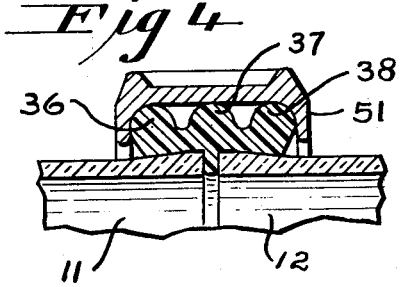
INVENTOR.
COURTLAND C. STANTON
BY Clarence R. Patty Jr.
ATTORNEY

United States Patent Office 3,084,959
Patented Apr. 9, 1963

3,084,959
PIPE COUPLING HAVING A BAND CLAMP AND
RESILIENT SLEEVE
Courtland C. Stanton, Corning, N.Y., assignor to Corning
Glass Works, Corning, N.Y., a corporation of New
York
Filed Aug. 5, 1959, Ser. No. 831,859
2 Claims. (Cl. 285—233)

The present invention relates to pipe couplings and is primarily concerned with the provision of couplings particularly useful in reliably connecting two pieces of pipe, composed of glass or the like, in sealing relation in the simplest and most economical possible manner. The invention is primarily concerned with the provision of improved means for coupling together pieces of pipe whose walls externally flare or taper outwardly at their ends. Pipe of such form is quite extensively used in piping systems in chemical plants and in the dairy industry.

According to the invention a tubular gasket is provided that snugly fits over two adjoining pipe ends and has its bore bordering surface initially shaped to match the outwardly flared pipe ends, and additionally, is provided with an internally extending rib against which the pipe ends abut. The gasket wall in transverse section comprises end and mid regions of great thickness separated from one another by intervening web or hinge regions of relatively minor thickness as to height and width. The thick regions transversely may be of generally triangular or circular configuration, but in any instance the surfaces presented to the gasket clamping member employed and their shape are such that circumferential force applied thereto, normal to the axis of the pipes, tends to rigidly anchor and lengthen the gasket over the region of the joint bridged by it. On the other hand, the line of juncture between the surfaces of the end sections of the gasket and the clamp are made conical to form opposed inclined angles of approximately 120° so that as the clamp is being tightened about the gasket the applied lines of force to the end sections for the most part are directed toward the pipe ends through their engaged flared surfaces, and thus tend to shorten the gasket as it compresses about the pipe ends while the force being applied normal to the pipe axes resists such shortening. The meeting of these opposing forces in the thin hinge or web sections of the gasket tends to concentrate the forces in such regions to attain the desired sealing and holding action of the coupling.

For a better understanding of the invention reference is now made to the accompanying drawing in which:

FIG. 1 is a side elevation, partly in section, of two pieces of pipe connected in sealing relation by a coupling embodying the invention.

FIG. 2 is an end elevation of FIG. 1, partly in section.

FIGS. 3 and 4 are sectional views illustrating alternative forms of the invention.

FIG. 5 is a diagrammatic view illustrating the compressional forces set up when a clamp and gasket embodying the invention is employed.

Referring to the drawing in detail, pipes, such as 11 and 12 have their similarly flared ends 14 and 13 butted against a rib 15 of an annular gasket whose bore wall surfaces match the exterior contour of pipe ends 13 and 14. In the form of gasket shown in FIG. 1 in transverse cross section, the gasket wall has the general configuration of three triangular sections 16, 17, and 18, respectively, joined to one another by relatively thin hinge or web sections 19 and 20, respectively. Conveniently, the gasket is provided with further clamp engaging flanges 21 and 22 to protect the pipes from possible direct engagement with a clamp.

The gasket is tightly clamped about the pipe ends by means of an axially split clamp 23 and suitable clamping bolts such as 24. The cylindrical surface 25 of the clamp engages the crests of sections 16, 17 and 18 and thus imparts thrust thereto normal to the pipe axes, which tends to lengthen the gasket, whereas its gasket engaging surface regions 32 and 33 match the slant of the end surfaces 30 and 31 of the gasket and impart forces of in the general directions of the pipe ends. These forces tend to shorten the gasket to attain the desired clamping action in the more readily deformable hinge or web regions 19 and 20 of the gasket, as hereinbefore mentioned.

The manner in which the foregoing forces are applied is diagrammatically illustrated in FIG. 5 wherein F represents the applied tightening force which tends to lengthen the gasket, R the direction of movement of the gasket material toward the hinges H which resist shortening as R tries to retain its length when force F constricts its area. The final force S is the desired sealing and holding action of the coupling.

In the alternative form of the invention illustrated in FIG. 3 the middle section 27 is generally triangular in cross section, whereas the outer sections 26 and 28 are substantially circular in cross section. The cross sectional shape of the gasket end region engaging surfaces of the clamp 50 is correspondingly modified.

In the alternative form of the invention illustrated in FIG. 4 all three sections 36, 37, and 38 substantially correspond in shape to sections 26 and 28 employed in combination with clamp 50, and employ a similarly shaped clamp 51.

The compressive action imparted by clamps 50 and 51 on their associated gaskets are in substance much the same as in the showing of FIG. 5.

What is claimed is:

1. In a coupling for joining two pieces of pipe in sealing relation and whose end regions have their exterior surfaces tapered outwardly in the direction of their ends, a tubular gasket of resilient material having a bore wall contour matching the contours of such exterior surfaces and having a rib for projection between the adjoining ends of such pieces of pipe, said gasket having an outer configuration embodying two annular end sections and a middle section of triangular cross sectional configuration with their base areas connected to one another by sections of small cross sectional area relative to the cross sectional areas of triangular configuration, and a clamping band circumferentially surrounding said gasket having axially tapered inner end wall portions that locally apply forces to the outer end regions of such end sections in directions to compress such rib between the pipe ends, and having a wall region that applies forces to the middle section toward the axial center of the coupling to compress such middle section about the surrounded surfaces of the pipe ends.

2. In a coupling for joining two pieces of pipe in sealing relation and whose end regions have their exterior surfaces tapered outwardly in the direction of their ends, a tubular gasket of resilient material having a bore wall contour matching the contours of such exterior surfaces and having a rib for projection between the adjoining ends of such pieces of pipe, said gasket having an outer configuration embodying two annular end sections and a middle section of triangular cross sectional configuration with their base areas connected to one another by sections of small cross sectional area relative to the cross sectional areas of triangular configuration, and a gasket clamp having a straight cylindrical surface arranged about and bridging the respective sections of said gasket and having axially tapered circular surfaces facing the outer end surfaces of the respective end sections of the gasket whereby, when the clamp is tightened about said gasket, forces are applied by the cylindrical surface of the clamp tending to elongate the gasket while forces are also applied by the end surfaces thereof tending to shorten the gasket to concentrate such forces collectively about the pipes in the annular regions thereof occupied by the sections of the gasket defined as of relatively small cross sectional area.

References Cited in the file of this patent

UNITED STATES PATENTS

| | | |
|---|---|---|
| 106,041 | Farjon | Aug. 2, 1870 |
| 2,426,423 | Woolsey | Aug. 26, 1947 |
| 2,983,529 | Price | May 9, 1961 |
| 3,006,663 | Bourne | Oct. 31, 1961 |

FOREIGN PATENTS

| | | |
|---|---|---|
| 547,066 | Great Britain | Aug. 12, 1942 |
| 549,183 | Great Britain | Nov. 10, 1942 |
| 809,583 | Great Britain | Feb. 25, 1959 |